E. FETTER.
SPLICE CURING METHOD AND APPARATUS.
APPLICATION FILED JULY 13, 1920.
1,364,362.
Patented Jan. 4, 1921.
4 SHEETS—SHEET 1.
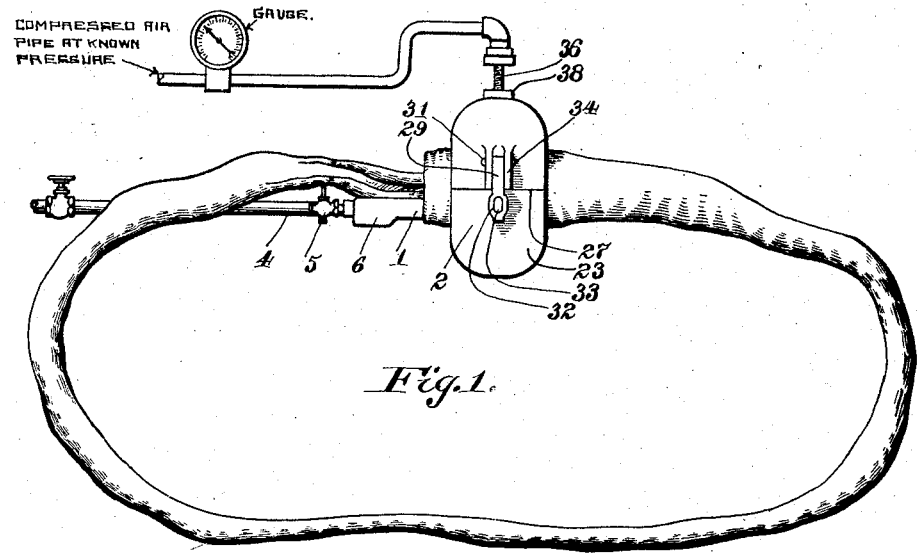
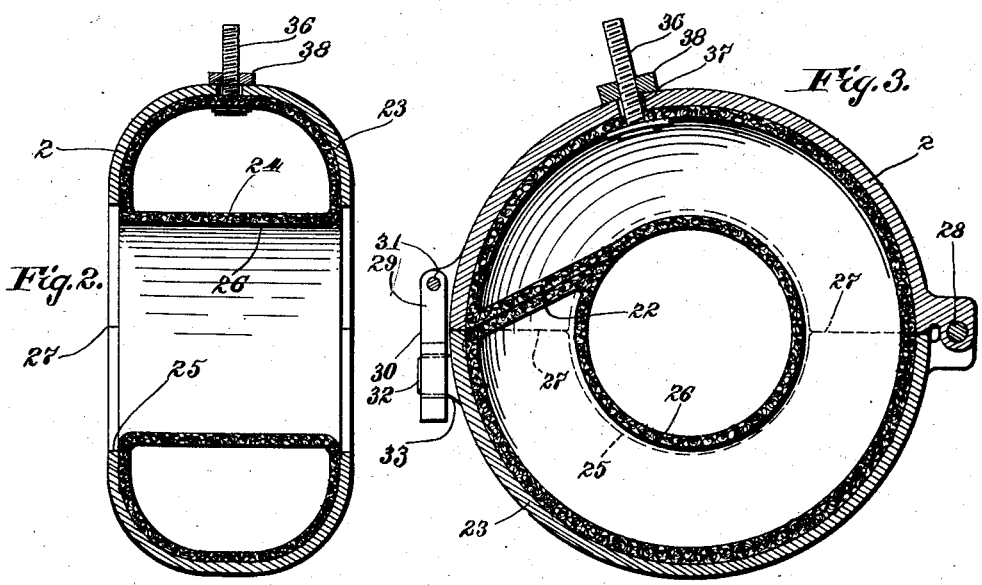

E. FETTER.
SPLICE CURING METHOD AND APPARATUS.
APPLICATION FILED JULY 13, 1920.
1,364,362.
Patented Jan. 4, 1921.
4 SHEETS—SHEET 2.
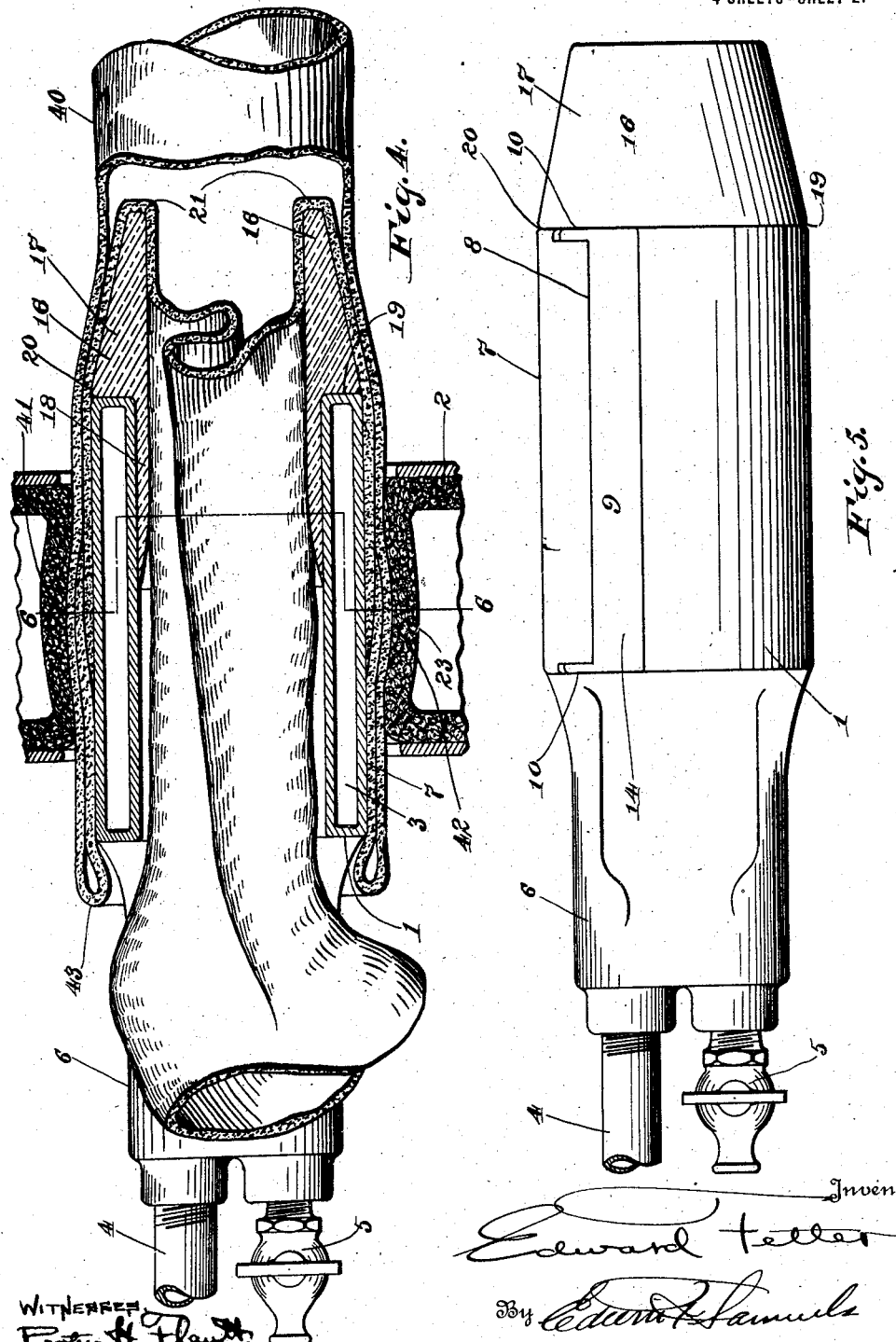

E. FETTER.
SPLICE CURING METHOD AND APPARATUS.
APPLICATION FILED JULY 13, 1920.
1,364,362.
Patented Jan. 4, 1921.
4 SHEETS—SHEET 3.
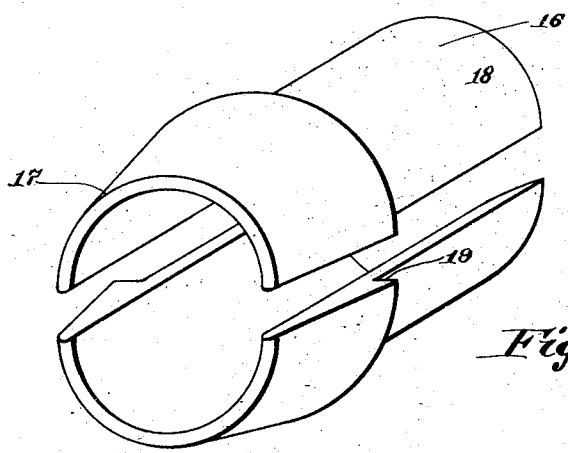
Fig. 9.
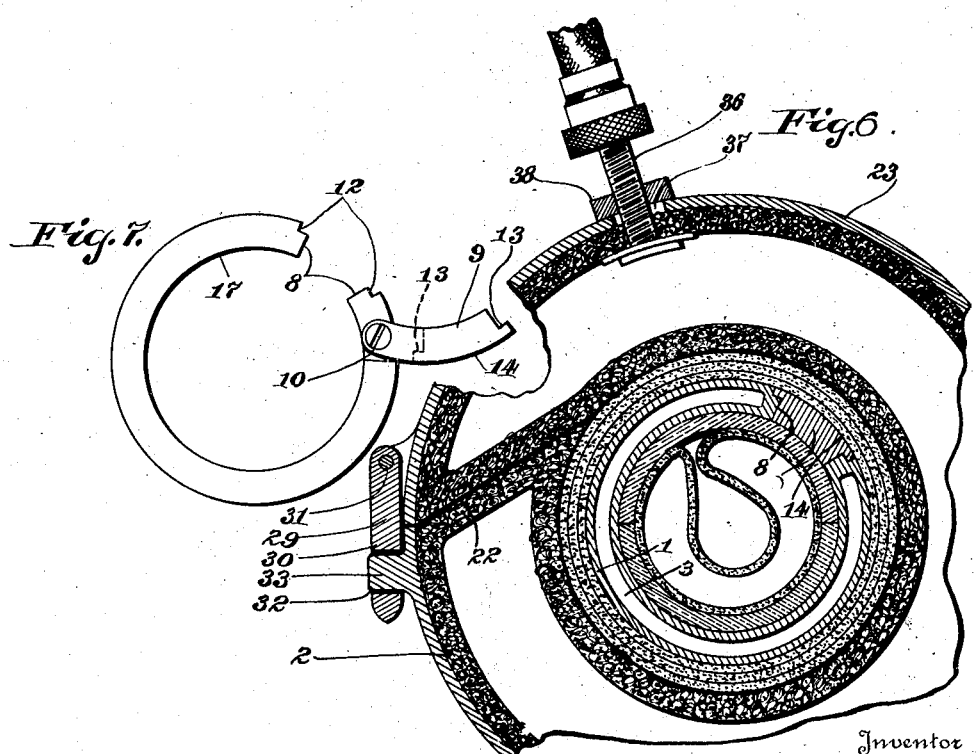
Fig. 7.
Fig. 6.

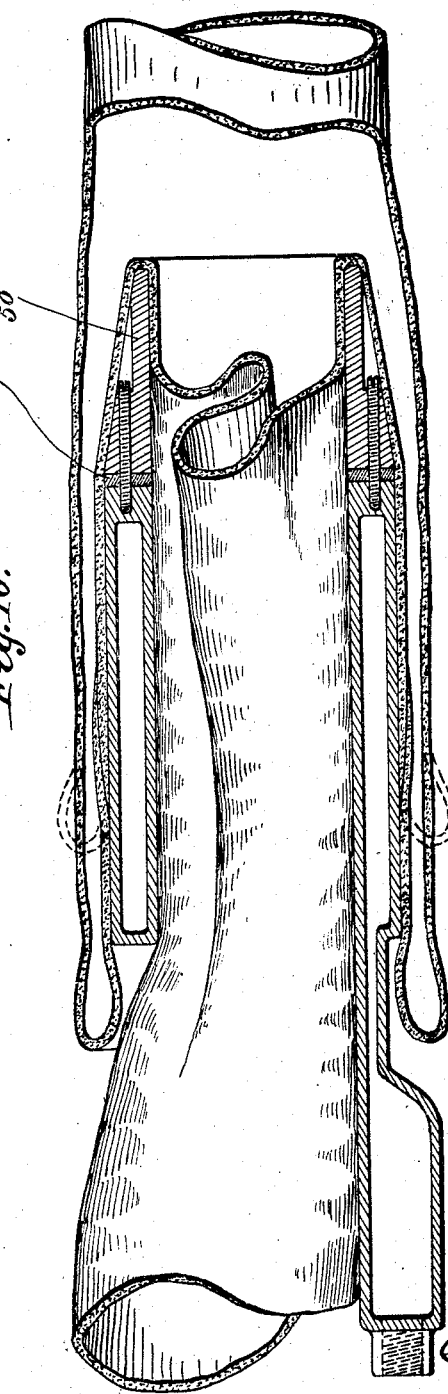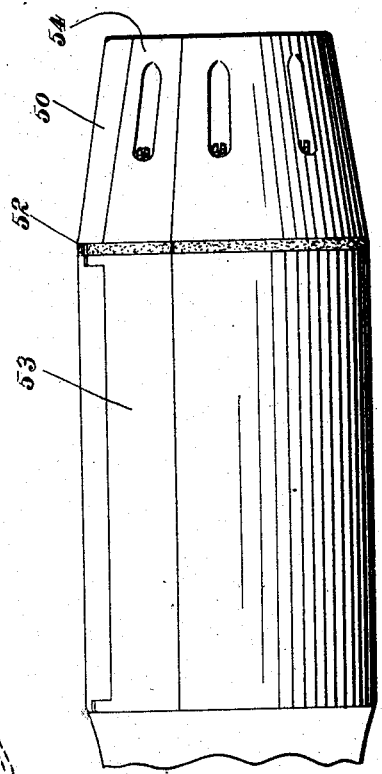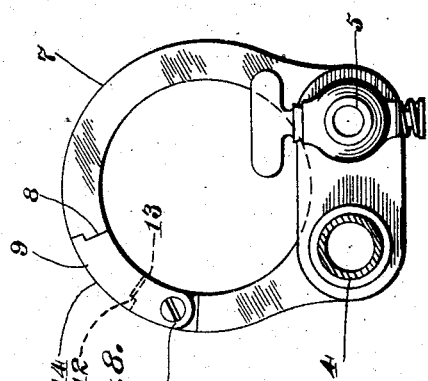

UNITED STATES PATENT OFFICE.

EDWARD FETTER, OF BALTIMORE, MARYLAND, ASSIGNOR, BY MESNE ASSIGNMENTS, TO THE PNEUMATIC TUBE STEAM SPLICER COMPANY, OF BALTIMORE, MARYLAND, A CORPORATION OF MARYLAND.

SPLICE-CURING METHOD AND APPARATUS.

1,364,362.      Specification of Letters Patent.      Patented Jan. 4, 1921.

Application filed July 13, 1920. Serial No. 396,012.

*To all whom it may concern:*

Be it known that I, EDWARD FETTER, a citizen of the United States of America, residing in the city of Baltimore, State of Maryland, have invented certain new and useful Improvements in Splice - Curing Methods and Apparatus, of which the following is a specification.

In the manufacture of inner tubes for pneumatic tires, the product consists of circular tubes, each made by splicing together the two ends of a section of straight or curved rubber tubing of a length corresponding to the length or long circumference of the particular tube being made.

At the present time the bulk of these splices are produced by what is known as the acid or cold treatment, though a comparatively small number of tubes are being produced, principally of the larger sizes, in which the splice is cured by heating. A substantial percentage of the tubes produced by the cold treatment have proved defective and it is conceded that to produce satisfactory results most exact conformance by the operatives to certain conditions, formulas, etc., is essential, and great care and skill are necessary. On the other hand, by the hot treatment, with reasonable care, work of a better quality and greater permanence is assured, the apparent preference for the cold treatment which has hithertofore existed having been due to the lack of a quick and efficient apparatus for and method of splicing the tubes by the hot treatment.

The acid or cold splice has not proved effective in the larger sizes, and some manufacturers now cure the splice in these large size tubes by the hot treatment, employing methods and apparatus which are comparatively slow and cumbersome. The greater speed hithertofore obtained with the cold or acid splice has caused it to be almost universally employed in connection with the smaller sizes.

The present invention provides a method and apparatus by which it is made possible and feasible to produce perfect tubes without regard to size by the hot treatment, at a rate which equals or exceeds that at which the manufacturers using the cold treatment are now producing them, and with a decreased expense. While this invention is particularly effective in connection with the hot treatment, it includes certain steps and features which are equally applicable to splicing tubes by the cold or acid treatment. The present apparatus and method embody and include the invention described in applicant's previous Patent No. 1,312,029, and application No. 390,024, filed June 18, 1920.

In splicing by both the hot and cold methods, the ends of the tubes are coated with cement, having preferably been skived so as to form a neat joint and prevent undue thickening of the spliced portion. The coated surfaces are then brought together, which, in forming such a splice, means that the meeting ends are telescoped and caused to adhere in a preliminary way; then pressure is applied until the cure is completed.

By the hot method heat and pressure are applied at the same time, and in both methods, in order that the results may be satisfactory, it is desirable that a uniform pressure be applied to the entire splice, and that this pressure should be ascertainable and controlled or controllable.

To this end I have utilized a known property of fluids including gases, *i. e.*, that they transmit pressure equally in all directions. The method of my invention comprises the use of fluid as a medium for applying pressure to the splice and equalizing this pressure.

More specifically, to prevent the escape of the fluid, I preferably use a sack or pad, referred to herein as a fluid-inflated sack or pneumatic pad, by which the pressure is equalized and distributed uniformly throughout the area being treated.

The use of fluid as a pressure-transmitting medium also makes it feasible to control and determine the intensity of the curing pressure according to the conditions presented, as to thickness of rubber, kind of cement, temperature, etc.

Other features of the invention have relation to the details and means whereby uniform pressure is thus applied to the splice, and to various coöperating parts and combinations, and to an improved splicing method, as will more fully appear.

In the accompanying drawings I have illustrated a tube splicer embodying my invention in its preferred form as developed to meet the present demand for tube splicing apparatus. In the drawings:

Figure 1 is an elevation showing the tube splicing apparatus and a tube during the splicing operation.

Fig. 2 shows a pneumatic clamp in section, the view being taken on a plane including the axis.

Fig. 3 is a section illustrating the same on a central plane at right angles to the axis.

Fig. 4 is a section taken on a plane of the axis, showing a tube and mandrel and clamp in operative relation.

Fig. 5 is a plan of the mandrel.

Fig. 6 is a transverse section through the apparatus, including the tube.

Fig. 7 is an end view of the mandrel.

Fig. 8 is a view of the opposite end of the same.

Fig. 9 is a perspective view showing the leader or nose removed.

Fig. 10 is a longitudinal sectional view of a modified form showing the tube partly inflated in blowing on or blowing off position.

Fig. 11 is a side elevation showing the modified form of the mandrel.

Referring to the drawings by numerals and having particular reference to the enlarged sectional view, Fig. 4, the apparatus as illustrated consists of a hollow mandrel, or former, 1, coöperating with a pneumatic or fluid pressure pad 2, which as illustrated and in the preferred form of the invention is in the form of a pneumatic ring held in position by a suitable clamp.

The former, or mandrel, when intended to be used in hot splicing, is provided with a steam jacket or other heating means, at 3, which is supplied with steam from a suitable source, by way of steam pipe 4, the same being released at the will of the operator by way of a pet cock 5, the steam pipe 4 and pet cock 5 being, in the form of the invention shown, connected to an extension 6 of the mandrel proper, which is of reduced diameter as compared to the vulcanizing or forming surface 7 of the mandrel, which is preferably cylindrical or otherwise curved to conform to the tube. The reduced diameter at 6 has the effect of releasing the tension at the folded zone of the tube, preventing creasing during the heat treatment.

For convenience in applying the tube to the mandrel in vulcanizing relation, the mandrel is slotted preferably in a longitudinal direction at 8, as shown in Figs. 5, 6 and 7, and this slot is provided with a gate 9, which, as shown, is hinged at 10 to the body of the mandrel, to swing outward, in the general direction of the radius of the mandrel, about an axis substantially parallel to the axis of the mandrel, from closed to open position and vice-versa. In the form of the invention shown both the slot 8 and the gate 9 are provided with coöperating shoulders, 12 and 13, and in closed position the outer surface 14 of the gate lies exactly flush with the cylindrical surface 7 of the mandrel.

In connection with the mandrel I have illustrated a tapered leader 16, which is preferably of heat-insulating material, or, more broadly, it is insulated from the heating portion of the mandrel. This member, which has an insert portion 18 engaging the mandrel to hold it in position, is preferably made in sections, or otherwise arranged for the convenient admission of the tube; and the forward end, i. e., the end opposite to the steam pipe and pet cock, 4 and 5, is shouldered at 19 to the diameter of the outside surface 7 of the mandrel, so that the shoulder 19 bears against the end of the mandrel, providing a surface 20 flush or nearly flush with the surface of the mandrel. This surface 20 is given a reducing taper from the shoulder 19, toward the end, providing a nose or leader for the mandrel, so called on account of its function in opening the tube as it is cuffed, and leading it onto the mandrel. By reference to Fig. 4 it will be noted that the tube is drawn tightly about the nose 17, forming a fold or bend 21, at which point the rubber is likely to be stressed or stretched. If the rubber is subjected to vulcanizing temperature under these circumstances, creasing with a consequent tendency to crack may result. This has been avoided in the present apparatus by the provision of a heat-insulated, or an insulating, preferably curved and tapered nose on the mandrel. In the cold treatment the leader is used to advantage in connection with the cuffing on of the tube.

In Fig. 10 I have shown a mandrel with a tapered leader 50 of metal, secured by screws 51, and insulated from the heated portions of the mandrel by a fiber or similar washer or ring 52. The gate 53 has a tapered extension 54 similarly secured and insulated.

In forming splices by both the hot and cold treatment, the cement-coated, telescoped ends of the tube are pressed tightly together during curing to effect a permanent joint, and in order that the product may be of uniform quality and that each particular splice may be continuous, uniform and tight at all points, it is important that the pressure applied be uniform throughout the extent of each splice, and that the pressure applied be easily determined and regulated to meet conditions as to quality and thickness of the rubber, temperature, and nature of the cement.

An important feature of the present invention resides in the equalization of the pressure applied, by use of a fluid pressure equalizing and transmitting medium. Preferably the fluid is confined in a bag or sack which is held in contact with the splice and inflated or filled with fluid under pressure so that the fluid is in effect the pressure-applying, equalizing and distributing medium.

More particularly, in the preferred form of the invention the pneumatic pad 2 is in the form of a ring, which is split or provided with separable meeting ends at 22 (see Fig. 3), and in order that the pneumatic pad may operate effectively in applying, distributing and equalizing pressure applied to the splice, in accordance with the form of the invention illustrated, the pad is inclosed within a ring clamp 23.

The pneumatic pad 2, as it has been used in the manufacture of tubes in accordance with the applicant's method in the development of this invention, is composed of fabric and rubber, resembling the material of which pneumatic tires or shoes are composed, so that it will withstand considerably more than the necessary degree of inflation at vulcanizing temperatures, repeated almost indefinitely, without such deterioration as to render it unserviceable.

The pneumatic pad shown is of substantially semi-circular or semi-cylindrical cross-section, with the flat side 24 forming the inner periphery of the ring. The meeting ends 22, as shown, are formed on an incline at substantially 45° with the radius, so that they overlap, tending to close the joint at the ends and present a smooth inner surface to the tube which is being spliced.

The ring clamp 23 is hollowed out to fit and receive the pad, being, therefore, of similar outline and cross-section as to the chambers, but slightly larger, so as to receive and inclose the pad; the inner peripheral wall, which would correspond to the wall 24, being omitted, and the opening in the ring at 25 being perceptibly larger than the opening 26 in the pad, so that the ring clamp cannot contact or cut the tube during the curing operation.

The clamping ring is split or separated into two parts, preferably along the line 27, which corresponds to a long diameter of the ring, the two parts, as shown, being connected at the periphery at one end of the diameter by a hinge 28, and at the other end by a latch 29, in the form of a hasp 30, pivoted at one end 31 to one section of the clamping ring, having an elongated aperture 32 which receives and preferably fits rather closely over a correspondingly formed pin or projection 33 on the other ring section. The hasp is seated between guiding ears 34, which prevent side play, the whole device being arranged to bring the parts into uniform relation at each clamping operation.

The pad is provided with means whereby it may be conveniently inflated, shown in the form of valve stem 36, and this valve stem is passed through a suitable aperture 37 in the ring clamp, and may be secured by a nut 38.

In splicing a tube in accordance with the method of my invention, the meeting ends, preferably skived to form a smooth joint, are coated with cement, the properties and composition of which vary in accordance with the method of the proposed treatment, whether it be hot or cold, and the surfaces are brought into close contact, the ends being telescoped, giving the parts the relation which they are to occupy in the finished product, the uncured cement serving to hold them together in a preliminary way.

The gate 9 in the mandrel being open, the flattened tube is passed through the slot, one-half of the leader 16 being preferably in position. The gate is then closed and the other half of the leader inserted. The tube now extends straight through the opening in the mandrel, the splice being just beyond the tapered end 17, which may be integral with the mandrel (see Fig. 10).

The next operation consists in inflating the tube with air until it reaches a diameter slightly in excess of the outside diameter of the mandrel (see Fig. 10). For this purpose the usual supply of compressed air now piped through the majority of factories for various purposes, is available, the valve plunger being preferably absent so that the tube is immediately deflated when the cuffing-on operation now being described is completed. Inflation of the tube in this manner, combined with the effect of the tapered end of the insert or leader, makes it easy to fold or cuff the tube back over the mandrel, as indicated by reference character 40 and as shown in detail in Figs. 4 and 10.

At this point it is important to note that if the splice is being formed by the hot treatment method, the tube must be so related to the mandrel prior to the cuffing-on operation, as to bring the splice when cuffed over the mandrel, directly in contact with the mandrel surface, as shown in Fig. 4, and the mandrel is heated to a suitable vulcanizing temperature by the introduction of steam into the jacket 3 from a suitable source of supply, by way of the steam pipe 4.

For the acid treatment the mandrel is now heated and the splice may, to equal advantage, and usually is, permitted to appear on the outside of the cuffed portion of the tube.

To prevent creasing of the tube and possible cracking at the fold, particularly in connection with the hot treatment, the end of the mandrel at 6, where the steam pipe 4 and the pet cock 5 are located, is reduced in diameter beyond the vulcanizing surface 7, and the fold or bend 43 is carried beyond the vulcanizing surface.

Curing is accomplished by the application of pressure to the entire splice, either with or without heat, depending on the nature of the cement.

An important feature of the present invention relates to a means and method for applying pressure to a tube splice during curing, equalizing the pressure so that it is uniform throughout the extent of the splice, making it conveniently determinable to meet the conditions presented, and giving increased speed of operation whereby the delay and expense incident to wrapping for this purpose, in accordance with the previous practice, are eliminated.

To this end I have utilized the known principle that fluid transmits pressure equally in all directions, and have succeeded in making this known property of fluid available in this connection by confining the fluid under pressure in a flexible bag or sack held or supported in contact with the splice, so that the fluid pressure is transmitted to the entire splice, resulting in the desired uniformity of pressure at all points on the splice.

As compressed air, at known and regulated pressures, is conveniently available in all factories, I have used a pneumatic pad which is inflated and deflated at each operation, the pad being clamped about the splice which is on the mandrel inflated and permitted to remain inflated while the splice is under treatment, being preferably deflated when the cure is completed and the tube is about to be removed from the mandrel.

In accordance with the applicant's present practice, the pneumatic pad, preferably inclosed in the ring clamp, is passed around the tube immediately over the splice, the clamp is closed, locking the pad in position about the splice, and the compressed air pad, air preferably under a known pressure, is applied to the valve stem 36 leading to the pad, and the latter is inflated.

It has already been explained that if the hot treatment is being practised, the mandrel is kept at vulcanizing temperature by maintaining a sufficient supply of steam in the jacket 3, or by means of heat supplied from any other suitable source.

When the predetermined period of treatment has passed, the pressure in the pad is released by opening the stem 36; the clamp, which is no longer under tension is unlocked, the clamping ring and pneumatic pad are removed, and the tube is removed from the mandrel, which latter operation is accomplished most conveniently by inflating the tube, so that the tension about the mandrel is reduced.

The method of my invention comprises the employment of fluid as a vehicle to transmit, equalize and distribute pressure to and over a splice or patch in connection with inner tubes, in curing the same in the manufacture of tubes, or in repairing tubes.

While I have described my method and apparatus in connection with the splicing of rubber tubing in the manufacture of inner tubes for pneumatic tires, it is clear that it may be utilized within the scope of my invention not only in the splicing of tubes in repair work, as by inserting a new section of tubing in the case of blow-outs, but that it may also be used in applying patches by vulcanization in connection with both the hot and cold method of curing.

I have thus described specifically the method of my invention and an apparatus by means of which it may be practised, the application also embodying certain features of novelty to which I lay claim as part of my invention. This description has been made specific, in order that the method and apparatus may be clearly understood, made and used by those skilled in the art, but the specific terms herein are not intended to limit the invention, the same being used descriptively rather than in a limiting sense, the scope of the invention being defined in the claims.

What I claim and desire to secure by Letters Patent is:

1. A tube-splicing appliance, comprising a pneumatic pad, and means for applying pressure to the splice by inflating the pad.

2. An appliance for splicing inner tubes for pneumatic tires, comprising a hollow ring of flexible material, adapted to contain fluid under pressure, and means for clamping the same about a tube.

3. A tube-splicing appliance, comprising a hollow split ring of flexible material, the same having an inlet passage whereby it may be inflated, and means for clamping the same about a tube.

4. A tube-splicing apparatus, consisting of an internal mandrel over which a portion of the tube to be spliced is folded or cuffed; an external pneumatic pad; and means for clamping the same about the tube on the mandrel and applying pneumatic pressure to the splice.

5. A tube-splicing appliance, comprising means for applying pressure to the splice and equalizing the same, consisting of a pad containing fluid under pressure, and means for supporting the same in contact with the splice.

6. A tube-splicing appliance, comprising means for applying pressure to the splice and equalizing the same, consisting of a pad adapted to contain fluid under pressure, and means for supporting the same in contact with the splice, said means being in the form of a clamp having a chamber inclosing the pad.

7. A tube-splicing apparatus, comprising a rigid support, or former; a pad adapted to contain fluid under pressure; and means for supporting the pad whereby it is adapted to press the spliced portion of the tube against the former, the fluid serving to equalize and distribute the pressure on the splice.

8. A method of splicing inner tubes for pneumatic tires, which consists in providing a supporting surface at one side of the splice, and applying pressure, by means of a hollow pad or sack containing fluid under pressure, to the opposite side.

9. A tube-splicing appliance, comprising a hollow flexible pad containing fluid, and means for applying uniform pressure to the splice by pressing the pad against the same.

10. A tube-splicing method which includes as a step the application of fluid pressure to the splice during curing to hold the surfaces in close contact.

11. A tube-splicing method, which consists in providing a support for one side of the portion of the tube being spliced, and providing an inclosure for fluid under pressure in contact with the opposite side of the splice and setting up fluid pressure within said inclosure whereby pressure is applied to the splice for the curing period.

12. A mandrel for supporting inner tubes during splicing, having an end or leader of insulating material.

13. A mandrel for supporting and forming inner tubes during splicing, having a tapered end of insulating material.

14. A cylindrical mandrel for inner tubes, for supporting and forming the same during splicing, having a tapered end of insulating material.

15. A mandrel for inner tubes having a section of uniform, transverse cross-section, and a tapered leader or end portion.

16. A mandrel for inner tubes having a section of uniform, transverse cross-section, and a tapered, detachable leader or end portion.

17. A hollow, jacketed mandrel for inner tubes, having a tapered end portion of insulating material.

18. A hollow mandrel for inner tubes, having a removable tapered end portion flush with the mandrel surface.

19. A removable tapered end portion for a hollow tube-splicing mandrel, adapted to lead the tube onto the mandrel, the same having a shouldered tapered portion and an insert extending inside the hollow of the mandrel to support the end portion.

20. A mandrel for inner tubes having a tapered insulating leader.

21. a tube-splicing method, which consists in providing a rigid support for one side of the tube being spliced and applying fluid pressure to the opposite side of the splice and thus compressing the spliced portion against the rigid support.

22. A tube-splicing method, which consists in cuffing the spliced portion of the tube, suporting it rigidly from within, passing an elongated flexible container about the outside of the splice, supporting it rigidly in such position and inflating the container to apply fluid pressure to the splice.

23. The combination with a pneumatic ring pad of a ring clamp having a chamber to receive and inclose the ring, the chamber being open along the inner periphery of the ring to permit the pad to engage a tube suitably supported from within.

24. In combination with a pneumatic ring pad for use in splicing inner tubes, a clamp for the same in the form of a ring having an annular chamber to inclose the pad, the chamber being open along its inner periphery, and the ring being split and hinged at one side and having fastening means at the other side.

25. A ring clamp for a pneumatic ring pad for use in curing tube splices, the ring clamp having an annular chamber open along its inner periphery and being formed in two sections, having a hinge at one side and fastening means at the other side.

26. A ring clamp for pneumatic ring pad for use in curing tube splices, the ring clamp having an annular chamber open along its inner periphery and being formed in two sections, having a hinge at one side and fastening means at the other side, the latter consisting of a hasp hinged to one section and a pin on the other section, the pin being formed to coöperate with the hasp to draw and hold the parts in close relation.

27. A ring clamp for a pneumatic ring pad for use in curing tube splices, the ring clamp having an annular chamber open along its inner periphery and being formed in two sections, having a hinge at one side and fastening means at the other side, the latter consisting of a hasp hinged to one section and a pin on the other section, the pin being formed to coöperate with the hasp to draw and hold the parts in close relation, and the hasp having guiding members at the sides.

28. A method of treating inner tubes in curing joints in the walls thereof, which consists in providing a support for one side of the tube wall being treated and applying fluid pressure to the opposite side of the same and thus compressing the joint against the rigid support.

29. A tube-treating method for forming joints or seams in the walls of the tube, or affixing patches thereto, which consists in cuffing the tube through and over a hollow support, passing an elongated, flexible container about the outside of the cuffed portion, supporting the flexible container rigidly in such position and inflating the container to apply fluid pressure to the portion of the tube being treated.

30. A device of the type described comprising a vulcanizer including means upon which the inner tube of a pneumatic tire may be reversely applied, in combination with a pneumatic clamp adapted to provide for the retention of tube ends in position upon said means in effecting the splicing or joining of the same together.

31. A device of the type described including a vulcanizer adapted to provide for reversely turning back a portion of the inner tube of a pneumatic tire in splicing the ends of said tube, in combination with a pneumatic clamp of annular chambered formation adapted to embrace said reversely turned back portion of said tire tube.

32. A vulcanizer for splicing the ends of the inner tube of a pneumatic tire, including a pneumatic clamp adapted to provide for applying pressure to the overlapping tube-ends forming the splice.

33. A vulcanizer for splicing the ends of the inner tube of a pneumatic tire, in combination with a pneumatic clamp of annular chambered formation in general outline and a guard for said clamp articulated together in sections and adapted to be snapped or fastened together upon said clamp for the effective retention of the clamp upon the vulcanizer.

34. A vulcanizer adapted for the application thereto, as in reversely turning the tube ends of the inner tube of a pneumatic tire reversely back upon itself, upon the vulcanizer, in combination with a hollow annular pneumatic member adapted to embrace the turned back portion of the tube, and to be distended for exerting pressure upon said reversely turned back tube portion, and means for delivering a heating medium into said vulcanizer.

Signed by me at Baltimore, Maryland, this 30th day of June, 1920.

EDWARD FETTER.

Witnesses:
PORTER H. FLAUTT,
MARY R. HOPKINS.